April 25, 1961 E. W. GLOVER 2,981,084
UNIVERSAL JOINT

Filed March 16, 1960 2 Sheets-Sheet 1

INVENTOR.
Earl W. Glover
BY
E. W. Christen
ATTORNEY

April 25, 1961  E. W. GLOVER  2,981,084
UNIVERSAL JOINT
Filed March 16, 1960  2 Sheets-Sheet 2
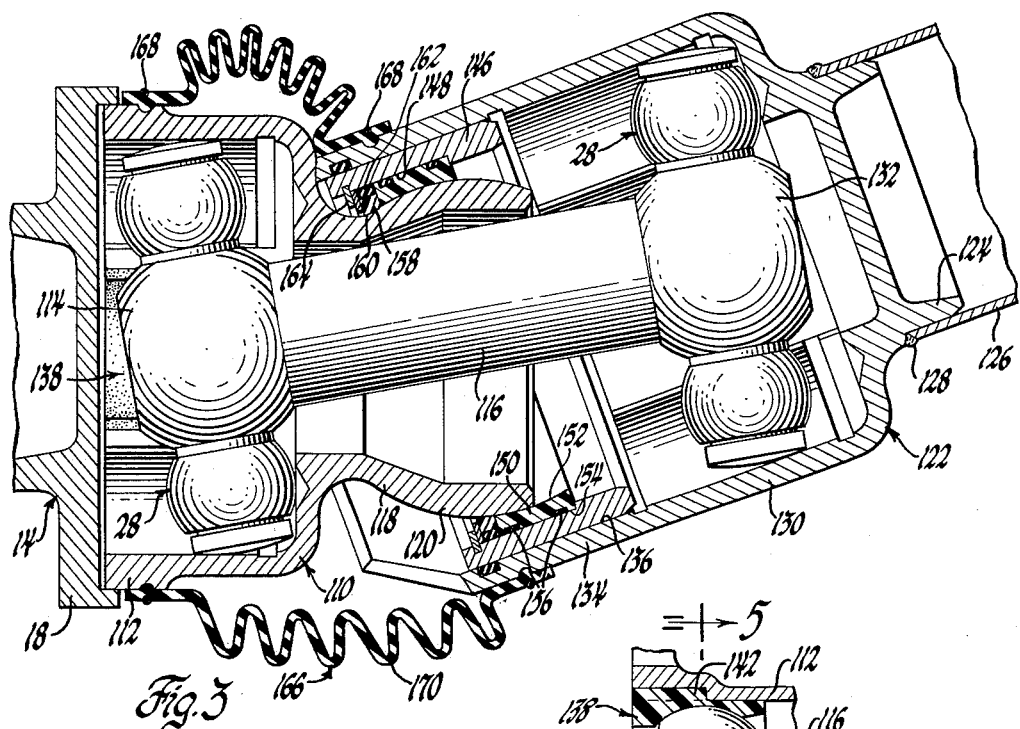
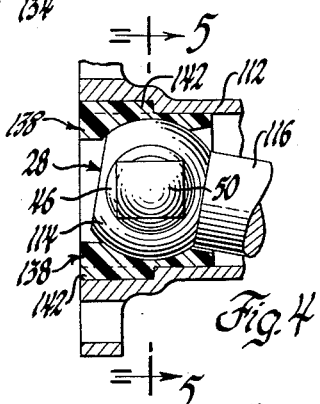
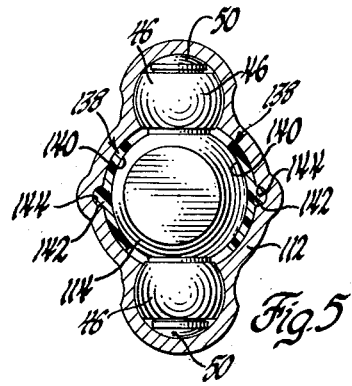
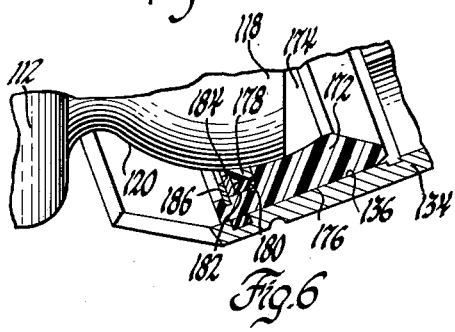
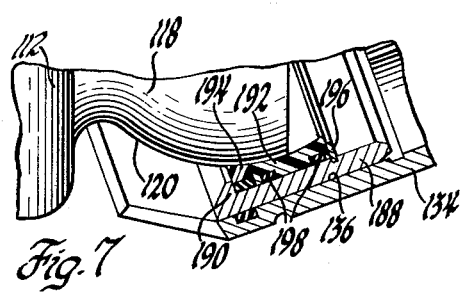
INVENTOR.
Earl W. Glover
BY
E. W. Christen
ATTORNEY United States Patent Office 2,981,084
Patented Apr. 25, 1961

2,981,084

UNIVERSAL JOINT

Earl W. Glover, Saginaw, Mich., assignor to General Motors Corporation, Detroit, Mich., a corporation of Delaware Filed Mar. 16, 1960, Ser. No. 15,487

10 Claims. (Cl. 64—21)

This invention relates to universal joints and more particularly to a constant velocity universal joint providing a high degree of angularity and axial slip.

In motor vehicle driveline design and manufacture it is often necessary to provide a universal joint permitting a high degree of angularity, because of the styling of the automobile. This may be required by a lowered floor, or by various attempts to eliminate or decrease the size of the tunnel passing through the passenger compartment.

It is also necessary in motor vehicle manufacture to provide some means in the vehicle driveline for permitting the takeup of changes in the length of the driveline. These changes may occur due to changes in height of the rear axle caused by bumps or holes in the road surface. As the rear axle goes up or down along with the road wheels, the driveline must change in length, and if the driveline is to change in length, some means must be provided therein to allow for the change.

Universal joints in the past have seldom provided both of these features in a single joint. It is the common practice to provide a first universal joint with a high degree of angularity and a second joint which permits axial slip and takeup of changes in the length of the driveshaft. Generally, the combination of high angularity and axial slip is not found in available universal joints, and to further add the provision of a constant velocity requirement to the joint makes it even more difficult to locate an acceptable construction suitable for the high volume production required in motor vehicle manufacture. Any universal joints that do combine these features are cumbersome and complicated, being extremely expensive to manufacture, due to the requirements for precision made parts and difficulties in assembly.

The device in which this invention is embodied comprises, generally, a universal joint of the double pot type in which a shaft, having the usual trunnion and bearing assemblies located therein, extends between a pair of spaced pots. One of the pot members is allowed axial movement with respect to the connecting shaft, and means are provided for centering the joint. These means may include a crosspin extending through the connecting shaft and riding in a spherical stamping extending from one of the pot members, or may include centering shoes disposed in one of the pot members and engaging the end of the connecting shaft disposed therein.

With a construction of this nature, high angularity may be obtained between the input and output driveshaft portions and the joint may be constructed so as to provide constant, or substantially constant, velocity torque transmission. Axial slip is permitted at the same time, thus combining the three desirable features of high angularity, constant velocity and axial slip in a single workable universal joint.

The structure may be easily manufactured and inexpensively produced, in the volume of production required for motor vehicle manufacture, and is found to be uncomplicated and would not require any more precision to construct than the normal universal joint.

These and other advantages will become more apparent from the following description and drawings in which:

Figure 3 is a cross-sectional view of another modification of the universal joint illustrating the position of the various parts, with the input and output portions relatively angularly disposed and showing a modification of the manner in which the joint is centered.

Figure 4 is a cross-sectional view of a portion of the universal joint of Figure 3, illustrating the manner in which the cross shaft is axially retained in one of the universal joint ports.

Figure 4 is a cross-sectional view of a portion of the universal joint illustrated in Figure 3, taken substantially along the line 5—5 of Figure 4 and looking in the direction of the arrows.

Figure 6 illustrates a third modification of the universal joint centering means, with parts broken away and in section to illustrate the position of the various parts.

Figure 7 is a modification of the universal joint with parts broken away and in section to illustrate the position of the various parts.

Figures 1, 2:
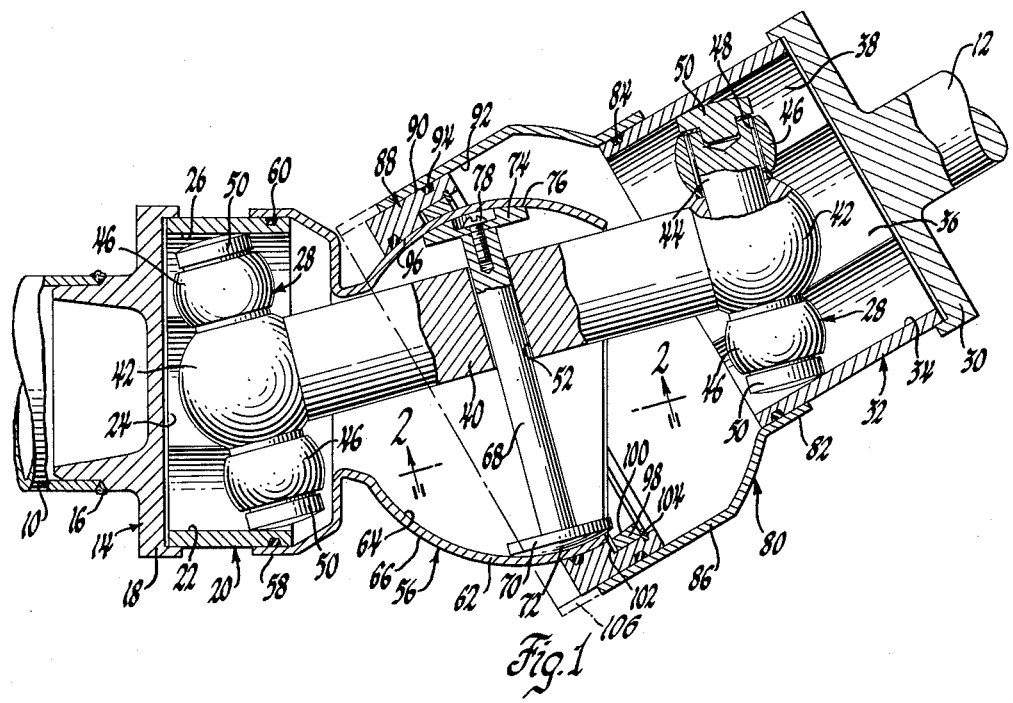
Figure 1 is a cross-sectional view of one modification of the universal joint illustrating the position of the various parts and with the input and output driveshaft portions relatively angularly disposed.
Figure 2 is an elevational view of a portion of the universal joint illustrated in Figure 1, taken substantially along the lines 2—2 of Figure 1 and looking in the direction of the arrows to illustrate one manner in which the joint is centered.

Referring more particularly to the drawings, one modification of the universal joint is shown in, and is best described with reference to, Figure 1. A driveshaft portion 10, which may be tubular or solid, extends from a vehicle transmission and is to transmit torque to a second driveshaft portion 12, which may also be tubular or solid and which would extend to the vehicle rear axle.

Tubular driveshaft portion 10 is provided with a flange member 14, which may be welded thereto as at 16, the flange 18 being secured in some suitable manner to a pot housing, illustrated generally by the numeral 20. The pot housing is provided with three bores 22, 24 and 26, which receive the usual trunnion and bearing assembly, illustrated generally by the numeral 28. Similarly, the driveshaft portion 12 is provided with a flange 30 to which is secured, in some suitable manner, a conventional pot housing 32 having three bores 34, 36 and 38 formed axially therethrough. These bores also receive a usual trunnion and bearing assembly 28.

Connecting the two pot housings 20 and 32 is a shaft member 40 which is provided with a spherical enlargement 42 at each end. The spherical enlargements are received in the central bore in each pot member, that is, bores 24 and 36 in pot members 20 and 32 respectively. The trunnion and bearing assemblies 28 are received in the spherical enlargement 42 on the ends of the shaft 40, and may comprise a crosspin 44 pressed into the shaft 40 and about which a spherical bearing sleeve 46 is permitted to rotate. An annulus of needle bearings 48 is provided between the bearing sleeve 46 and the crosspin 44 to permit relatively frictionless rotation of the spherical sleeve. A bearing cap 50 is received in the crosspin 44, the upper surface of which is spherically formed. The spherical bearing sleeve 46 and the spherically surfaced thrust button, or bearing cap, 50 are conformed to the configuration of the outer bores of the pot members, that is, bores 22 and 26 in pot member 20, and bores 34 and 38 in pot member 32. It may be seen that the bearing sleeves 46 and the bearing caps 50 permit both angular and axial movement of the shaft 40 within the pot members 20 and 32.

Shaft 40 may be provided with a slot 52 intermediate the ends thereof, the slot may be formed in a flattened portion 54, as illustrated in Figure 2. The purpose of the transverse slot will be later described.

Secured to the pot member 20 is an inner housing, illustrated generally by the numeral 56, which may be formed from a sheet metal stamping, or the like. The inner housing has a cylindrical portion 58, so formed to overlie the open end of pot member 20, and is secured thereto in any suitable manner. An O-ring seal, or the like, 60 may be provided between the cylindrical portion 58 and the pot member 20 in order to prevent the passage of dirt and other foreign materials to the interior of the joint.

The inner housing 56 has a generally spherical portion 62 which extends toward the pot member 32 and encloses a portion of the shaft 40. The spherical portion 62 is so formed as to provide an inner spherical surface 64 and an outer spherical surface 66. The purpose for these surfaces will be hereinafter described.

In order to locate the shaft 40 with respect to the pot member 20, and to prevent axial movement in that portion of the universal joint, a centering pin, illustrated generally by the numeral 68, is received within the spherical portion 62 of the inner housing 56. The pin 68 has a cap 70 integrally formed on one end thereof, the cap 70 having a spherically formed surface 72 corresponding to the inner surface 64 of the inner housing 56. A cap 74 is secured to the opposite end of the pin 68 and has a spherical surface 76, also corresponding to the inner spherical surface 64 of the inner housing 56. Cap 74 is not formed integrally with the pin 68 but is secured thereto by a machine screw or the like 78, to permit ease of assembly of the pin 68 within the spherical portion 62 of the inner housing 56.

Pin 68 passes through the slot 52 formed in the shaft 40 and may be seen to locate the shaft 40 with respect to pot member 20 regardless of the relative angularity of these two parts. As the driveshaft angularity changes, the shaft 40 slides along the pin 68 and the change in angularity between the shaft 40 and the surface of the inner housing 56 is compensated for by the rotation of the pin 68 along the spherical surfaces 64 and the spherical surfaces on the pin caps 72 and 74 within the inner housing 56.

A second or outer housing, illustrated generally by the numeral 80, has a portion 82 corresponding to the shape of the pot member 32 and is secured thereto in any suitable manner. An O-ring or other seal 84 may be provided at the connection in order to prevent the entry of dirt and foreign material to the interior of the universal joint.

Outer housing 80 has a second cylindrical portion 86 which extends toward pot member 20 and encloses a portion of the inner housing 56 and a portion of the shaft 40.

In order to separate the outer housing 80 from the inner housing 56, an annular ring, illustrated generally by the numeral 88, is provided and which lies between the two housings. Annular ring 88 has an outer cylindrical surface 90, which corresponds to the inner surface 92 of the outer housing 80, and an O-ring or other seal 94 is provided to prevent the passage of dirt and foreign materials to the interior of the joint. Outer housing 80 is allowed to slide along the outer surface 90 of the ring 88 as the driveshaft changes its effective length.

The position of the annular ring 88 with respect to inner housing 56 is made positive by a spherical surface 96 formed on the inner surface of the annular ring 88. The spherical surface 96 corresponds to the outer spherical surface 66 of the inner housing 56, permitting the annular ring 88 to rotate about the center of the inner housing 56 and to constantly maintain its position thereon.

In order to assemble the annular ring 88 on the inner housing 56 it is necessary to provide an insert 98 which takes the form of an annular ring having an inner spherical surface 100 also corresponding to the outer surface 66 of the inner housing 56. Insert member 98 is received in an annular groove 102 formed in the annular ring 88 and is retained therein by a conventional retaining ring 104. The ring 88 may be of sufficient diameter to be inserted over the spherical inner housing 56 from the left, as viewed in Figure 1, and the insert 98 installed after the ring is in place. Since the insert 98 has an edge diameter substantially equal to the major diameter of the spherical housing, it may easily be inserted from the right, as viewed in Figure 1. It may be seen that with the insert 98 in position, the annular ring 88 is prevented from leaving or disengaging the inner housing 56 and thus maintains its position thereon and positions the outer housing 80 and the pot member 32 with respect to the inner housing 56 and the pot member 20.

The operation of the universal joint is as follows: Rotation of one of the driveshaft members 10 or 12 causes rotation of the pot member which is secured thereto. Assuming, for purposes of illustration, that shaft member 10 is being rotated by a motor vehicle engine and shaft member 12 is to maintain the degree of angularity illustrated in the drawing with respect to shaft member 10, rotation of the engine crankshaft will cause rotation of pot member 20. Pot member 20, acting through the trunnion and bearing assemblies 28 and the shaft member 40, thus causes rotation of the pot member 30 and the driveshaft portion 12. As the pots rotate, centering pin 68 rotates the shaft member 40 with respect to the pot member 20 and prevents axial movement therebetween. Pin 68 may be seen to oscillate within the inner housing 56 as the shaft member 40 slides along pin 68 in its rotation. The annular ring 88 will also oscillate about the inner housing 56 to maintain the position of the outer housing 80 with respect to the inner housing 56.

When it is necessary for the driveshaft to change in length, such change is permitted by the movement of the pot member 32 and allowing the right-hand trunnion and bearing assembly 28 to slide within the pot 32. The outer housing 80 also slides along the annular ring 88 to a position as shown in dashed and dotted lines and illustrated by the numeral 106. With the outer housing and pot member 32 in this position, the transmission of torque and the operation of the universal joint is unimpaired.

A second modification of the universal joint is illustrated in Figures 3 through 5, and similar parts bear similar reference numerals. The input connection 14 has a similar flange 18 formed thereon, and to which is secured a pot member 110 in any suitable manner, as by bolts. The pot member 110 has a conventional pot portion 112, having the usual axial bores for receiving the enlargement 114, on the end of the cross shaft 116, and the trunnion and bearing assembly, illustrated generally by the numeral 28. An extension 118 extends from the pot section 112 and encloses a portion of the cross shaft 116, the extension 118 having a spherical outer surface 120. The pot member 110, including the pot section 112 and the extension 120, may be cast, forged or manufactured in any other suitable manner so as to provide the axial bores and the spherical outer surface 120.

A second pot member, illustrated generally by the numeral 122, opens toward pot member 110 and encloses a portion of the cross shaft 116 and the extension 118. Pot member 122 has a cylindrical extension 124 extending axially therefrom and to which may be secured the tubular shaft portion 126 in any suitable manner, as by welding 128. A conventional pot section 130, having a plurality of axial bores to receive the enlargement 132 on the enclosed end of the cross shaft 116 and the trunnion and bearing assembly illustrated generally by the numeral 28, extends in an opposite direction from extension 124. A second cylindrical extension 134 extends from the pot section 130 and has a cylindrical inner surface 136. The pot member 122, including extensions 124 and 134 and pot section 130, may be formed from a forging or casting, or in any other suitable manner such that the cylindrical inner surface 136 and the axial bores of the pot section 130 are suitably provided.

As in the modification illustrated in Figure 1, the cross shaft 116 extends into and between the two pot sections 112 and 130 to transmit driving torque from one to the other. The left hand end of the cross shaft, as illustrated in the drawings, is rotatably disposed in the pot section 112 and prevented from axial movement by a pair of centering shoes, illustrated generally by the numeral 138 and best illustrated in Figures 4 and 5. The centering shoes each include a spherical inner surface 140, which engages the spherical enlargement 114, and a rib 142 extending along the opposite side thereof and received in a suitable groove 144 formed in the pot section 112. The centering shoes thus permit angular movement or rotation of the cross shaft 116 with respect to the pot section 112, but prevent any axial movement thereof by the clamping action provided.

In order to permit axial movement of the pot member 122 with respect to the pot member 110, a metallic sleeve 146 is disposed within the cylindrical extension 134 of the pot member 122. Sleeve 146 has an annular groove 148 formed therein to receive a ring 150, having an inner spherical surface 152 to engage the spherical surface 120 of the extension 118, and a cylindrical outer surface 154 engaging the cylindrical surface of the sleeve 146 and disposed in the groove 148.

Ring 150 may be formed of a synthetic resin having good bearing properties, such as elasticity, high strength, stiffness, and toughness. Examples of such materials are acetal resin (Delrin), polytetrafluoroethylene (Teflon), and polyamid (nylon). In order to assemble the ring over the extension 118, the ring may be split in a plane of the axis of the ring, at one position on the ring, such that the ring may be spread a sufficient amount to be received over the end of the spherical extension. A pair of O-rings 156, received in suitable grooves in the ring 150, provide a seal between the ring 150 and the sleeve 146, serve to close the gap formed by the split, and also provide a means for taking up the wear that might occur between the ring 150 and the extension 118.

In order to further effect a seal between the interior of the sleeve 146 and the interior of the universal joint, a synthetic resin seal member 158, having a spherical inner surface 160, is provided adjacent the synthetic resin ring 150. A suitable O-ring 162, disposed between the seal ring 158 and the sleeve 146, biases the ring 158 into engagement with the extension 118. A retaining ring 164, received in a suitable groove in the sleeve 146, retains the seal ring 148 and the synthetic resin ring 150 in the proper position in the sleeve 146 and in the groove 148.

To prevent the entry of water and foreign material to the interior of the universal point, a boot, illustrated generally by the numeral 166, may be provided between the two pot members 110 and 122. The boot is secured to each of the pot members by a retaining ring 168 and may be formed of a plurality of corrugations or convolutions 170.

In operation, the universal joint provides constant angular velocity at one position of angularity, and substantially constant velocity at other positions of angularity of the input and output shafts. As the input shaft rotates, the cross shaft 116 is rotated by the pot member 110, thus rotating the pot member 122. The synthetic resin ring 150 maintains the location of pot member 122 with respect to pot member 110 at all times, and the sleeve 146 permits axial movement of the pot member 122 with respect to the pot member 110 without a change in angularity or an interruption in the torque transmission.

Another modification of the centering means is illustrated in Figure 6, in which the spherical enlargement 118, having the spherical surface 120, is separated from the cylindrical extension 134 by a synthetic resin ring 172. Ring 172 has a spherical inner surface 174 engaging the spherical surface 120, and a cylindrical outer surface 176 engaging the cylindrical inner surface 136 of the extension 134. A synthetic resin seal ring 178 and an O-ring 180 are disposed in a suitable groove 182 formed in the synthetic resin ring 172, and a spacer member 184 and retaining ring 186 retain the seal 178 in the groove 182 in the ring 172. In the assembly of this modification of the universal joint, the synthetic resin ring 172 is snapped over the spherical extension 118. Thus, no slit or cut is required in the material.

A further modification of the centering means is illustrated in Figure 7 in which the spherical extension 118, having the spherical surface 120, is separated from the cylindrical extension 134, having a cylindrical inner surface 136. A sleeve 188 is received in the extension 134 and has a shoulder 190 formed thereon to receive and locate a synthetic resin ring 192 and a synthetic resin seal ring 194. A suitable retaining ring 196 secures the ring 192 and the ring 194 in the proper position in the sleeve 188. Suitable O-rings 198 seal the surfaces between the ring 192 and the sleeve 188 and also provide a wear takeup feature as previously described.

Thus, it may be seen that a constant velocity high angle universal joint providing axial slip may be easily used and inexpensively manufactured, and yet provide all of the desirable features of a universal joint, from a standpoint of motor vehicle production.

What is claimed:

1. A universal joint comprising a pair of pot members disposed in spaced relation to and opening toward each other, a shaft having a trunnion and bearing assembly secured in each end thereof extending into and between said pot members and being movable therein, an inner housing extending from one of said pot members and enclosing a portion of said shaft, said inner housing having a spherical portion disposed between said pot members, an outer housing extending from the other of said pot members and enclosing said inner housing, ring means between said inner housing and said outer housing to locate said outer housing with respect to said inner housing for permitting relative axial movement of said outer housing and said other pot member with respect to said inner housing and said shaft and said one pot member, and means for axially locating said shaft member with respect to one of said pot members to prevent axial movement thereof and permit substantially constant velocity torque transmission through said universal joint.

2. A universal joint comprising a pair of pot members disposed in spaced relation to and opening toward each other, a shaft having a trunnion and bearing assembly secured in each end thereof extending into and between said pot members and being movable therein, said shaft having a slot formed transversely therethrough and intermediate the ends thereof, an inner housing secured to one of said pot members and enclosing a portion of said shaft, said inner housing having a spherical portion disposed between said pot members, a pin having spherically surfaced caps on each end thereof slidably received in said inner housing and through said slot in said shaft for locating said shaft with respect to said inner housing and said one pot member, an outer housing secured to the other of said pot members and enclosing said inner housing, and an annular ring having a spherical inner surface and a cylindrical outer surface and disposed between said inner housing and said outer housing for locating said outer housing with respect to said inner housing and for permitting relative axial movement of said outer housing and said other pot member with respect to said inner housing and said shaft and said one pot member.

3. A universal joint comprising a first member having a plurality of axial bores formed therethrough, a second member spaced from said first member and having a plurality of axial bores formed therethrough, a shaft extending into and between said member and having a transverse slot formed therethrough and intermediate the ends thereof, said shaft having a substantially spherical enlargement formed on each end thereof and received in one of said bores in each of said members, a trunnion and bearing assembly in each end of said shaft and received in the others of said bores in said members, an inner housing secured to said first member and extending toward said second member, a portion of said inner housing having spherical inner and outer surfaces, a pin having spherically surfaced caps on each end thereof slidably received in said inner housing and through said slot in said shaft to locate said shaft with respect to said inner housing, a generally cylindrical outer housing secured to said second member and extending toward said first member and enclosing said inner housing, and an annular ring having a spherical inner surface engaging said outer surface of said inner housing and a cylindrical outer surface engaging the inner surface of said outer housing for locating said outer housing with respect to said inner housing and for permitting relative axial movement of said second member and said outer housing with respect to said first member and said shaft and said inner housing during normal operation of said universal joint.

4. A universal joint comprising a pair of pot members disposed in spaced relation to and opening towards each other, a shaft having a trunnion and bearing assembly secured in each end thereof extending into and between said pot members and being movable therein, one of said pot members having a spherical portion extending therefrom and enclosing a portion of said shaft, the other of said pot members having a cylindrical portion extending therefrom and enclosing a portion of said shaft and a portion of said spherical extension, a synthetic resin ring disposed between said spherical portion and said cylindrical portion for locating said cylindrical portion with respect to said spherical portion, said cylindrical portion being axially slidable over said ring and said spherical portion, and means for axially locating said shaft member with respect to one of said pot members to prevent axial movement of said shaft member with respect thereto and permit substantially constant velocity torque transmission through said universal joint.

5. The universal joint of claim 4 wherein said means for axially locating said shaft member comprises a pair of shoes secured in said one pot member and having spherical surfaces formed therein, said shoes receiving and retaining one end of said shaft member such that angular movement of said shaft member with respect to said one pot member is about the center of the end of said shaft member.

6. The universal joint of claim 4 and further including a corrugated cylindrical boot secured to each of said pot members and enclosing said universal joint to prevent the entry of water and foreign materials thereto.

7. A universal joint comprising a pair of pot members disposed in spaced relation to and opening towards each other, a shaft having a trunnion and bearing assembly secured in each end thereof extending into and between said pot members and being movable therein, one of said pot members having a spherical portion extending therefrom and enclosing a portion of said shaft, the other of said pot members having a cylindrical portion extending therefrom and enclosing a portion of said shaft and a portion of said spherical extension, a sleeve received in the open end of said cylindrical portion and axially slidable with respect thereto, said sleeve having an annular groove formed therein, a synthetic resin ring having a spherical inner surface and a cylindrical outer surface received in said groove and engaging said spherical portion to locate said cylindrical portion with respect to said spherical portion, and means for axially locating said shaft member with respect to one of said pot members to prevent axial movement of said shaft member with respect thereto and permit substantially constant velocity torque transmission through said universal joint.

8. The universal joint of claim 7 wherein said means for axially locating said shaft member comprises a pair of shoes secured in said one pot member and having spherical surfaces formed therein, said shoes receiving and retaining one end of said shaft member such that angular movement of said shaft member with respect to said one pot member is about the center of the end of said shaft member.

9. The universal joint of claim 7 and further including a corrugated cylindrical boot secured to each of said pot members and enclosing said universal joint to prevent the entry of water and foreign materials thereto.

10. The universal joint set forth in claim 7 in which said synthetic resin ring is cut in an axial plane, and further including an O-ring disposed between said sleeve and said ring to prevent passage of foreign materials therebetween and to bias said ring in the direction of said spherical portion to take up wear occurring therebetween during normal operation of said universal joint.

References Cited in the file of this patent

UNITED STATES PATENTS 2,360,786     Miquelon  ---------------- Oct. 17, 1944